UNITED STATES PATENT OFFICE.

HARRY WILLIAMS CHARLTON, OF JONES POINT, NEW YORK.

PROCESS IN THE MANUFACTURE OF SAND-LIME BRICK.

1,235,766.  Specification of Letters Patent.  Patented Aug. 7, 1917.

No Drawing.  Application filed April 13, 1917. Serial No. 161,893.

*To all whom it may concern:*

Be it known that I, HARRY WILLIAMS CHARLTON, a citizen of Canada, residing at Jones Point, in the county of Rockland, in the State of New York, have invented new and useful Processes in the Manufacture of Sand-Lime Brick, of which the following is a specification.

The invention relates to a method of producing a uniformly bonded sand lime brick, and consists in employing a new hydrate of lime as a binding agent. It is a porous compressible one containing less than the one molecule of water present in the normal hydrate, ($CaO.H_2O$), and appears to possess in addition to the well known lime-sand binding power, additional inherent cementing properties.

In a previous application, filed May 3rd, 1916, entitled Process of extracting potash from alkali-containing rocks, Serial No. 95,113, I mentioned the fact that digestion in an autoclave under steam pressure in presence of a large excess of water, produced compounds of unusual physical and chemical properties. These have since been researched by well known American authorities in ceramics and geology who have confirmed the view that the materials possess natural cementing properties. For some reason rather difficult to determine, digesting under pressure has a decided tendency to induce cementing properties in otherwise inert non-cementing materials. This is true of hydrate of lime in which the reaction is clearly defined and we obtain a new and different hydrate.

One would naturally suppose that on digesting $CaO.H_2O$ under high steam pressure in presence of ten times its weight of water, hydrates of the nature of $CaO.H_2O + xH_2O$ would result if any change occurred. On the contrary $CaO.CaO.H_2O$ or a material of approximately this composition results.

As the specific gravity of CaO is 3.25, and of $Ca(OH)_2$ is 2.078 it would naturally be inferred that $CaO.CaO.H_2O$ would have a specific gravity lying between them. On the contrary it is less than either and is 1.95.

As an example of an embodiment of the process, lime after slacking to $Ca(OH)_2$ is digested in an autoclave with five times its weight of water at a steam pressure of about 225 pounds for a couple of hours. It is then discharged, filtered and dried, and mixed with sand. After this it is pressed in a brick press and then subjected to the action of steam under a pressure of from 100 to 135 pounds for a period of from 8 to 12 hours.

The superior bonding properties of this type of brick and their low absorption, are due to the compressible and self-setting properties of the hydrate which oozes into all the spaces of the sand particles when the materials are molded and pressed into brick. The weak crumbling edges, so common in an ordinary sand lime brick, are avoided in this way.

Although sand lime brick are particularly referred to, the applicant does not wish to be confined to this alone but considers that the new process and the resulting product may be equally applicable to all the types of plastics of the sand lime class. These, comprising all steam hardened molded articles, are almost invariably referred to as sand lime products.

In the herein described process there has been a radical departure from the previously accepted methods, comprising, as they do, cementing with anhydrous, partially or fully slaked lime. It consists in employing a partially dehydrated hydrate made by the peculiar and almost unique method of digesting the normal hydrate in a large excess of water under pressure at elevated temperatures. The resulting material is very active chemically and it is thought that it represents a new and comprehensive group of cementing materials.

That partial dehydration instead of complete or superhydration should result from digesting under steam pressure in presence of a large excess of water is most paradoxical and contrary to theory.

It is obvious that those skilled in the art may vary the details of the process as well as the product without departing from the spirit of the invention and, therefore, I do not wish to be limited to the above disclosures except as may be required by the claims.

I claim:—

1. A process of manufacturing a composite brick which comprises steaming under pressure a mixture of inorganic material and a hydrate previously digested with water at a high temperature and pressure; substantially as described.

2. A process of manufacturing a composite brick which comprises subjecting to steam pressure a mixture of inorganic material and a hydrate whose water of combination is less than one molecule for each molecule of the contained oxid; substantially as described.

3. A process of manufacturing a composite brick which comprises subjecting to steam pressure a compressed mass of sand and an alkali earth hydrate whose water of combination is less than one molecule for each molecule of the oxid; substantially as described.

4. A process of manufacturing a sand lime brick which comprises subjecting to steam pressure a mixture of sand and a calcium hydrate whose water of combination is less than one molecule for each molecule of calcium oxid; substantially as described.

5. A process of manufacturing a sand lime brick which comprises subjecting to steam pressure a mixture of sand and a calcium hydrate whose water of combination indicates a formula of approximately $CaO.CaO.H_2O$. and whose specific gravity is less than that of the normal hydrate; substantially as described.

6. A process of manufacturing a sand lime brick which comprises intimately mixing sand and a calcium hydrate whose water of combination is less than that found in the normal hydrate, $Ca(OH)_2$, molding and pressing and subjecting to a steam pressure of from 100 to 135 pounds for a period of from 8 to 12 hours; substantially as described.

7. A process of manufacturing a sand lime brick which comprises digesting an alkali earth hydrate under steam pressure in presence of an excess of water, filtering and mixing with sand, compressing into the form of a brick and digesting at from 100 to 135 pounds pressure for from 8 to 12 hours; substantially as described.

8. A process of manufacturing a sand lime brick which comprises digesting one part of lime in five parts of water under a steam pressure of 225 pounds for a period of from one to three hours, filtering, drying and mixing with sand, molding and compressing into brick form, and digesting at from 100 to 135 pounds pressure for from 8 to 12 hours; substantially as described.

9. As an article of manufacture a brick whose interstices are filled with a calcium hydrate whose water of hydration is less than one molecule for each molecule of calcium oxid present; substantially as described.

HARRY WILLIAMS CHARLTON.

Witnesses:
  H. B. FINNEGAN,
  P. A. ANDERSON.

Copies of this patent may be obtained for five cents each, by addressing the "Commissioner of Patents. Washington, D. C."